US006822206B2

United States Patent
Haimer

(10) Patent No.: US 6,822,206 B2
(45) Date of Patent: Nov. 23, 2004

(54) DEVICE FOR THE INDUCTIVE HEATING OF A TOOLHOLDER

(75) Inventor: Franz Haimer, Hollenbach-Igenhausen (DE)

(73) Assignee: Franz Haimer Maschinenbau KG, Hollenbach-Ingenhausen (DE)

(*) Notice: Subject to any disclaimer, the term of this patent is extended or adjusted under 35 U.S.C. 154(b) by 0 days.

(21) Appl. No.: 10/470,027

(22) PCT Filed: Jan. 21, 2002

(86) PCT No.: PCT/EP02/00556
§ 371 (c)(1),
(2), (4) Date: Jan. 26, 2004

(87) PCT Pub. No.: WO02/057037
PCT Pub. Date: Jul. 25, 2002

(65) Prior Publication Data
US 2004/0149738 A1 Aug. 5, 2004

(30) Foreign Application Priority Data
Jan. 22, 2001 (DE) ......................... 101 02 710

(51) Int. Cl.[7] ................................. H05B 6/10
(52) U.S. Cl. .................... 219/635; 219/637; 219/640
(58) Field of Search ................. 219/600, 602, 219/635, 637, 639, 640, 642, 643, 647, 648, 652, 653, 658, 659

(56) References Cited

U.S. PATENT DOCUMENTS

| | | | | |
|---|---|---|---|---|
| 4,573,380 A | * | 3/1986 | Bald | 82/142 |
| 2003/0168445 A1 | * | 9/2003 | Haimer | 219/643 |
| 2003/0209535 A1 | * | 11/2003 | Haimer et al. | 219/600 |

* cited by examiner

*Primary Examiner*—Tu Hoang
(74) *Attorney, Agent, or Firm*—Scott D. Wofsy; Edwards & Angell, LLP

(57) ABSTRACT

The induction coil of a device that heats a toolholder (1) inductively for the tool change comprises a shielding collar (27) of magnetizable material which, firstly, concentrates the magnetic flux of the induction coil (13) in a sleeve section (5) of the toolholder (1) which holds the shaft (11) of a rotary tool with a press fit and, secondly, shields the part of the tool shaft (11) that projects out of the sleeve extension (5), in order to facilitate unclamping the tool from the toolholder (1). On its side facing the winding (19) of the induction coil (13) axially, the shielding collar (27) has an outer circumferential surface (31) which widens conically away from the sleeve extension (5) and an axial height (h) which is at least 1.5 times the diameter (d) of the tool shaft (11). The shielding collar (27) runs on all sides at a distance from a yoke shell (23) of magnetizable material which encases the winding (19) of the induction coil (13).

21 Claims, 3 Drawing Sheets

DEVICE FOR THE INDUCTIVE HEATING OF A TOOLHOLDER

BACKGROUND OF THE INVENTION

1. Field of the Invention

The invention relates to a device for the inductive heating of a sleeve section of a toolholder which contains a central holding opening for a shaft of a rotary tool, for example a drill or mill or reaming tool, said toolholder holding the shaft of the tool seated in the holding opening with a press fit and releasing it when heated.

2. Background of the Related Art

It is known, in particular in the case of tools rotating at high speed, to shrink their shaft into a sleeve section of a toolholder. For this purpose, the sleeve section is heated, for example by means of an induction coil which encloses it, so that the tool shaft can be plugged into the holding opening in the sleeve section, which is therefore enlarged. The external diameter of the tool shaft is somewhat greater than the nominal diameter of the holding opening, so that, after the sleeve section has cooled down, the tool is held firmly by a press fit in the toolholder so as to rotate with it.

In order to remove the tool, the sleeve section has to be heated again. Since, in this case, there is the risk that the tool shaft will also be heated, there can be problems if the thermal expansion of the sleeve section is inadequate, as based on the tool shaft, which likewise expands.

DE 199 15 412 A1 discloses an inductive heating device for heating the sleeve section of a toolholder. The device has an induction coil which can be placed on the sleeve section of the toolholder and, in this case, encloses the latter annularly with a radial spacing and which is fed with alternating electric current from a generator. The magnetic field of the induction coil induces induction currents in the electrically conductive, generally also magnetizable, material of the toolholder, which currents heat the sleeve section directly. The induction coil extends axially at least over the engagement length with which the tool shaft penetrates into the holding opening and ends with its winding axially approximately in the region of the front end on the tool side of the sleeve section. In the radial direction, the inner circumference of the induction coil runs at a distance from the sleeve section, in order to be able to use one and the same induction coil in the case of toolholders with a different external diameter of the sleeve section.

At its ends and on its outer circumference, the winding of the induction coil is encased with a jacket of magnetizable, that is to say a ferromagnetic or ferromagnetic, material whose high magnetic conductivity, as based on air, concentrates the magnetic flux substantially onto the jacket. The region of the jacket which is adjacent to the tool-side end of the sleeve section is formed as a substantially disk-like ring element, which rests with its inner circumference on the tool-side front end of the sleeve section and extends radially over the end surface of the winding of the induction coil as far as the outer circumference of the latter. The ring element forms a pole shoe which is intended to concentrate the magnetic flux of the induction coil onto the sleeve section.

SUMMARY OF THE INVENTION

It is an object of the invention to provide a device for the inductive heating of a toolholder which holds the tool with a shrink fit which, using simple means, permits the tool to be unclamped reliably from the toolholder.

The invention is based on a device for the inductive heating of a sleeve section of a toolholder which contains a central holding opening for a shaft of a rotary tool, said toolholder holding the shaft of the tool seated in the holding opening with a press fit and releasing it when heated. Such a device comprises an induction coil, which encloses the sleeve section of the toolholder annularly with a radial spacing for the heating, a generator that feeds the induction coil with electric current of periodically changing amplitude, and a ring element, enclosing the shaft of the tool close to the tool-side end of the sleeve section of the toolholder and made of a magnetizable material that concentrates the magnetic flux, the ring element, in the region of its smallest diameter, being closely adjacent to the tool-side end of the sleeve section, in particular bearing on the sleeve section.

The object specified above is achieved, under a first aspect of the invention, in that the surface of the ring element which faces the interior of the induction coil axially, at least in a subregion, extends radially between the outer circumference of the tool-side end of the sleeve section and the inner circumference of the induction coil and axially obliquely radially outward away from the end of the sleeve section.

The magnetic flux generated by the induction coil must heat the sleeve section as uniformly as possible over the entire axial length used for clamping the tool shaft. The tool-side end of the sleeve section has proven to be critical, since the adjacent axial end of the induction coil in the case of conventional induction coils must not project or project only insignificantly beyond the axial end of the sleeve section, in order to avoid the concomitant heating of the tool shaft through the eddy currents induced in the tool shaft. Attempts have already been made in a known way (DE 199 15 412 A1) to concentrate the magnetic flux in the region of the tool-side end of the sleeve section by means of a pole shoe in the form of a flat disk of magnetizable material which tapers toward the tool shaft. In the case of this known pole shoe disk, the disk surface that faces the interior of the coil runs axially normally to the axis of rotation of the toolholder. It has been shown that the shielding effect, on the one hand, and the magnetic flux concentrating effect, on the other hand, can be improved if the surface that faces the interior of the coil of the ring element consisting of magnetizable material extends obliquely or conically radially outward away from the axial end of the sleeve section. Such a course of the material approaches the course of the flux lines which the induction coil would have in the air medium and facilitates the concentration of the magnetic flux in the magnetizable material of the ring element. The improved concentrating effect is accompanied by an improvement in the shielding effect. Shielding ring elements of the type explained above are advantageous in particular when the ring element, in its radial outer regions, adjoins the part of the magnetic circuit of the induction coil which runs in air, that is to say assumes the course of the flux lines of such a magnetic field circuit, specifically even when the magnetic flux from the induction coil, in its further course, runs in a single-part or multi-part yoke shell of magnetizable material which covers the induction coil on its outer circumference and at least one of its two axial ends.

Under a second aspect of the invention, provision is made for the ring element to be formed as a shielding collar which projects axially beyond the tool-side end of the sleeve section over an axial height of at least 1.5 times the diameter of the shaft of the tool and whose greatest diameter is smaller than the greatest winding diameter of the induction coil. Such a ring element, formed as a shielding collar, not only shields the tool shaft magnetically in the region of the tool-side end of the sleeve section but, on account of its considerable height, as based on the tool shaft diameter, is also able to concentrate magnetic flux running obliquely with respect to the axis of rotation. It goes without saying that both aspects of the invention can be embodied in one and the same ring element.

To the extent that magnetizable material is mentioned above, this is to be understood to include material with high magnetic conductivity, such as ferromagnetic material, such as soft iron laminate, or ferromagnetic material, for example ferrite or the like. The generator which feeds the induction coil can be an alternating current generator, but also a generator which outputs pulsed direct current. Generators for higher-frequency or high-frequency currents are preferred.

In a preferred configuration, the ring element not only has, on its side facing the interior of the induction coil, an outer circumferential surface which widens conically axially away from the toolholder but also, on its side facing axially away from the toolholder, an inner circumferential surface of this type which widens conically. The inner conical circumferential surface not only facilitates the insertion or removal of the tool but ensures a concentration of the magnetic flux at a distance from the tool shaft. The inner and the outer circumferential surfaces expediently have approximately the same cone angle.

In the region of its outer circumference, the ring element can have a substantially cylindrical circumferential surface which, in particular, can be formed by an annular extension which projects from the ring element in the region of its outer circumference, axially away from the toolholder. Such a circumferential surface improves the flux concentration behavior of the ring element, in particular when its greatest diameter is smaller than the smallest winding diameter of the induction coil and, in this case, the ring element concentrates magnetic flux which reaches the ring element in an air portion of the magnetic circuit.

The surface of the ring element which faces the interior of the induction coil axially and runs obliquely expediently runs inclined at an angle of between 10° and 80°, preferably between 20° and 70°, with respect to the axis of the shaft of the tool. The axial height of the ring element is preferably at least twice the shaft diameter of the tool.

The ring element can extend until close to the external winding diameter of the induction coil, but expediently has a maximum diameter which is smaller than the smallest winding diameter of the induction coil. Otherwise, in the region of its outer circumference and/or at one or both of its ends, the induction coil can be provided with a jacket of a magnetizable material that concentrates the magnetic flux, which ensures concentration of the magnetic flux outside the ring element and can also deflect the magnetic flux toward the ring element.

The internal diameter of the induction coil is selected to be slightly larger than the external diameter of the sleeve section of the toolholder, in order to be able to use one and the same induction coil in toolholders with different sleeve section diameters. In order to be able to match the ring element better to different shaft diameters of the tool in such a case, the ring element is preferably held on a structural unit which surrounds the induction coil, by means of a disk of non-magnetizable material, in particular of plastic or ceramic, to be specific expediently such that it can be replaced during operation.

BRIEF DESCRIPTION OF THE DRAWINGS

Exemplary embodiments of the invention are to be explained in more detail below using a drawing, in which.

DETAILED DESCRIPTION OF PREFERRED EMBODIMENTS

Figure 1:
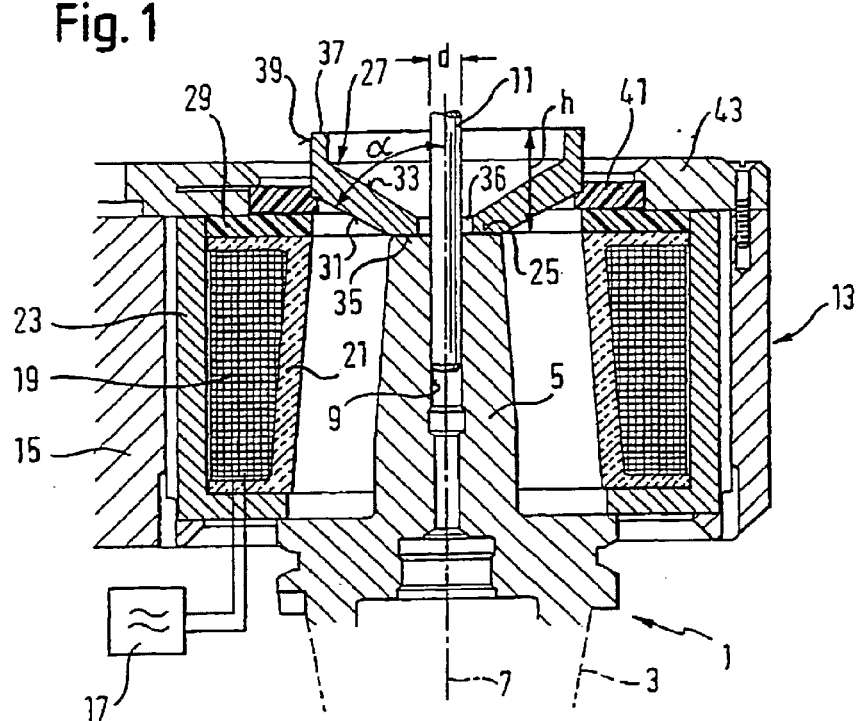
FIG. 1 shows an axial longitudinal section through an induction coil for the inductive heating of a toolholder and FIGS. 2–5 show axial longitudinal sections through variants of the induction coil.

FIG. 1 shows a toolholder 1, in one part here but possibly also made of many parts, of an at least electrically conductive but here also magnetizable material, such as steel, which has at its one axial end a standard connecting piece, such as a steep taper 3, and at its axial other end a sleeve section 5. Centrally in relation to the axis of rotation 7 of the toolholder, the sleeve section 5 has a holding opening 9 for a rotary tool which can be inserted with its shaft 11 into the holding opening 9 in a manner further explained below, but otherwise not specifically illustrated, for example a drill, a mill or a reaming tool. The external diameter of the shaft 11 is somewhat larger than the free nominal diameter of the holding opening 9, so that the shaft 11 inserted into the sleeve section 5 is held in a press fit for the transmission of the working torque.

In order to be able to insert the tool shaft 11 into the toolholder 1 or remove it from the latter, the sleeve extension 5 is widened by heating. Heating is carried out by means of an induction coil 13 which is placed on the sleeve extension 5 and encloses the latter concentrically with radial spacing of its internal diameter from the outer circumference of the sleeve section 5, which is held by means of a holder, indicated at 15, of an induction shrinkage device such that it can be displaced axially parallel to the axis of rotation 7 and is fed by a current generator 17 with alternating current or pulsed direct current at a frequency of, for example, 10 to 50 kHz. The magnetic flux generated by an approximately cylindrical winding 19 induces in the sleeve section 5 eddy currents, which heat the sleeve section 5 in a relatively short time and therefore widen the holding opening 9 sufficiently for the insertion or withdrawal of the tool shaft 11.

On the inside, the induction coil 13 has a coil former 21 consisting of temperature-resistant plastic or ceramic, to which the multilayer winding 19 is applied. The outer circumference and the end surface of the winding 19 that faces axially away from the tool is covered by a single-part, but possibly also multi-part, yoke shell 23 consisting of a magnetizable, electrically non-conductive material, which concentrates the magnetic flux in this surrounding region of the winding 19 onto the yoke shell 23. The yoke shell 23 can be produced from ferromagnetic material or composite magnetic materials based on ceramic or plastic, such as ferrite.

The winding 19 provided with the yoke shell 23 extends substantially over the entire length of the holding opening 9 and the sleeve section 5 intended to hold the tool shaft 11. With its end adjacent to the tool-side end surface 25 of the sleeve section 5, the winding 19 extends axially until approximately at the height of the end 25 of the sleeve section 5.

In order to deflect the magnetic flux from the yoke shell 23, projecting axially somewhat beyond the winding 19 on this side, in an optimum fashion toward the end 25 of the sleeve section 5 and, at the same time, to shield that part of the tool shaft 11 which projects beyond the sleeve section 5 and protect it against inductive heating, a shielding collar 27 approximately in the shape of a conical shell is placed on the end surface 25. The shielding collar 27 runs on all sides at a distance from the yoke shell 23 which, in the exemplary embodiment illustrated, does not extend beyond the tool-side end surface of the winding 19 but merely projects somewhat beyond this end surface. The tool-side end surface of the winding 19 in the exemplary embodiment illustrated is covered with a spacer disk 29 which consists of non-magnetic material, for example temperature-resistant plastic. In a variant, this disk 29, ending with its inner circumference in turn at a distance from the shielding collar 27, can likewise consist of the magnetic material of the yoke shell 23, that is to say it can be a constituent part of the yoke shell 23.

In the region between the outer circumference of the sleeve section 5 and the inner circumference of the winding 19, on the side pointing axially toward the winding 19, the shielding collar 27 can have an outer circumferential surface 31 which is shaped like a cone or truncated cone with an angle of inclination α of about 60°, as based on the axis of rotation 7. The likewise conical inner circumferential surface 33 facing axially away from the winding 19 has a generatrix which is approximately parallel to the outer circumferential surface 31. The shielding collar 27 has a flat contact surface 35 which faces the sleeve section 5 axially and runs normal to the axis, with which it rests flat on the end surface 25 of the sleeve section 5. On the outer circumference of the conical region of the shielding collar 27, the latter is provided with an annular extension 37 which projects axially away from the sleeve section 5 and has an annularly cylindrical outer circumferential surface 39. The external diameter of the annular extension 37, and therefore the shielding collar 27, is smaller than the internal diameter of the winding 19. The axial total height h of the shielding collar 27, with which it extends axially above the end surface 25, is more than twice as great as the shaft diameter d of the tool shaft 11 immediately outside the sleeve section 5. In the present case, the height h is somewhat more than three times as great as the diameter d.

Even though the annular gap remaining between the yoke shell 23 and the shielding collar 27 increases the magnetic resistance in the magnetic flux circuit of the induction coil 13, this portion of the magnetic circuit, extending in air, in conjunction with the conical shielding collar 27, permits, in the region of the tool shaft 11, a concentration of the magnetic flux onto the sleeve section 5 which is to a large extent free of scattered field. In this way, the sleeve section 5 can be heated inductively and therefore widened without excessive heating of the tool shaft 11 occurring, which facilitates unclamping of the tool shaft 11 from the toolholder 1. Otherwise, the axially adjacent region of the shielding collar 27 extends in the sleeve section 5, forming an annular gap 36 at a radial distance from the tool shaft 11.

The shielding collar 27 is fixed to an annular disk 41 of a temperature-resistant plastic or of ceramic and is replaceably connected to the holder 15 or a housing 43 of the induction coil 13 which is fixed to the holder 15 to form a structural unit. For the replaceable connection, the annular disk 41 and the housing 43 can be locked to each other, for example in the manner of a bayonet catch. In this way, the shielding collar 27 not only ensures the axial positioning of the induction coil 13 relative to the sleeve section 5, but can also be replaced in order to adapt one and the same induction coil 13 on the toolholder 1 to different diameters of the holding opening 9 or of the sleeve extension 5.

In the following text, variants of the device described using FIG. 1 will be explained. Components with the same effect are designated by the reference numbers from FIG. 1 and, to distinguish them, are provided with a letter. In order to explain the construction and the mode of action, reference is made to the preceding description and, in particular, the description relating to FIG. 1. The embodiments described below differ substantially only in the configuration of the shielding collar of the induction coil. The generator 17 is present, although not illustrated.

Figure 2:
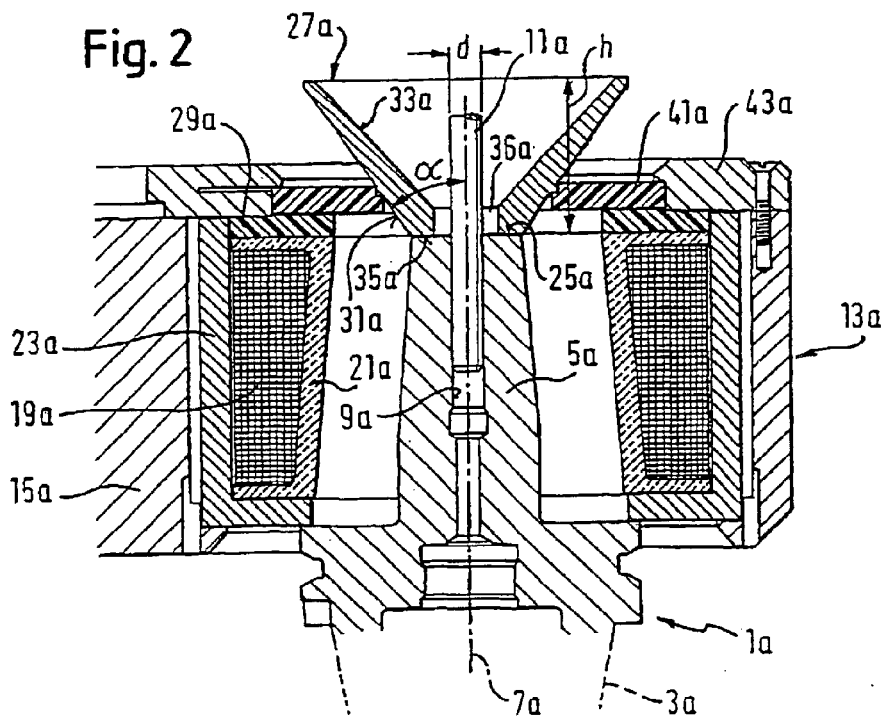

The shielding collar 27a in FIG. 2 differs from the shielding collar 27 from FIG. 1 substantially in the fact that the angle α is chosen to be smaller, of the order of magnitude of about 45° here, while the axial height h is about five times the diameter d of the tool shaft 11a. The largest external diameter of the shielding collar 27a is in turn chosen to be somewhat smaller than the minimum internal diameter of the winding 19a. Since the generatrix of the inner conical circumference 33a is inclined at a somewhat greater angle with respect to the axis of rotation 7a than the generatrix of the outer conical circumference 31a, the shielding collar 27a tapers outward. The conical surfaces 31a and 33a extend as far as the radially outer end of the shielding collar 27a and, accordingly, this shielding collar has no annular extension similar to the extension 37 from FIG. 1.

Figure 3:
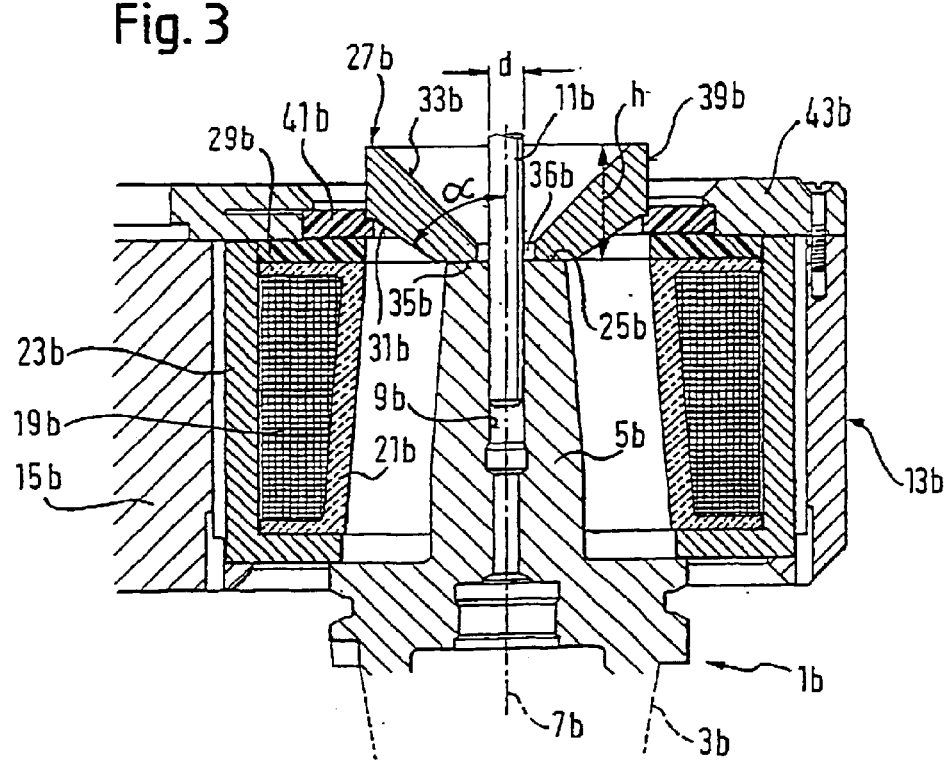

The shielding collar 27b illustrated in FIG. 3 differs from the shielding collar 27 from FIG. 1 substantially only in the fact that the generatrix of the inner circumferential surface 33b is inclined at a smaller angle with respect to the axis of rotation 7b than the generatrix of the outer circumferential surface 31b and, furthermore, extends rectilinearly as far as the front edge facing axially away from the contact surface 35b. Although the shielding collar 27b therefore has a circular-cylindrical circumferential surface 39b, it does not form an annular extension similar to the annular extension 37 in FIG. 1. The dimensioning of the angle a and the axial height h based on the tool shaft diameter d corresponds to the variant in FIG. 1.

Figure 4:
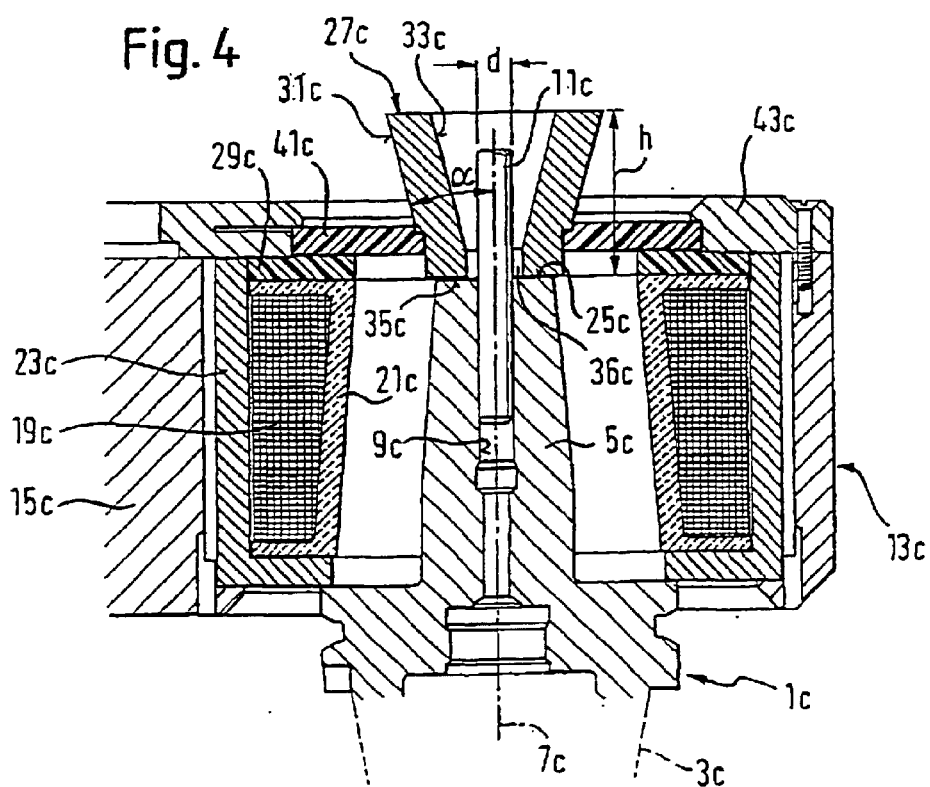

The embodiment of the shielding collar 27c in FIG. 4 differs from the, shielding collar 27a of FIG. 2 primarily in the fact that the angle of inclination a of the generatrix of the outer conical circumference 31c is smaller than in the variant of FIG. 2 and is of the order of magnitude of about 15°. The generatrix of the inner conical circumference 33c runs approximately parallel to the generatrix of the outer conical circumference 31c. The axial height of the shielding collar 27 is again about five times the diameter d of the tool shaft 11c.

Figure 5:
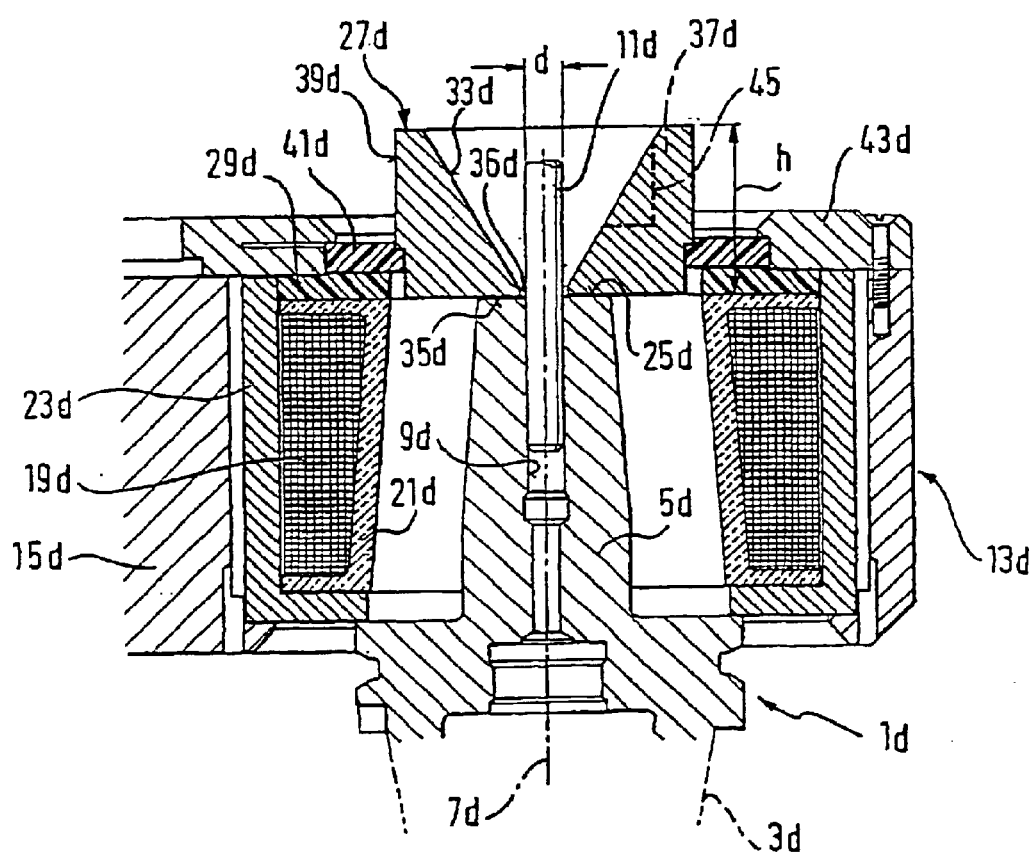

The variant of the shielding collar 27d in FIG. 5 differs from the variants explained above in that the axially normal contact surface 35d, with which the shielding collar 27d rests on the end surface 25d of the sleeve section 5d, reaches substantially as far as the cylindrical outer circumference 39d, that is to say there is no outer conical surface, as illustrated at 31 in FIG. 1. However, the axial height h of the shielding collar 27d is also here a multiple, five times in the exemplary embodiment illustrated, of the diameter d of the tool shaft 11d. The inner circumference of the ring formed in this way is provided with an inner conical surface 33d which, oriented axially away, widens radially outward, which makes it easier to grip the tool shaft 11d. As indicated by a dash-dotted line 45, the inner conical surface 33d can be provided with an annular throat, which produces an annular extension 37d on the shielding collar 27d.

What is claimed is:

1. A device for the inductive heating of a sleeve section (5) of a toolholder (1) which contains a central balding opening (9) for a shaft (11) of a rotary tool, said toolholder holding the shaft (11) of the tool seated in the holding opening (9) with a press fit and releasing it when heated, comprising:

a) an induction coil (13), which encloses the sleeve section (5) of the toolholder (1) annularly with a radial spacing for the heating;

b) a generator (17) that feeds the induction coil (13) with electric current of periodically changing amplitude; and c) a ring element (27), enclosing the shaft (11) of the tool close to the tool-side end of the sleeve section (5) of the toolholder (1) and made of a magnetizable material that concentrates the magnetic flux, the ring element (27), in the region of its smallest diameter, being closely adjacent to the tool-side end of the sleeve section (5), wherein the surface (31) of the ring element (27) which faces the interior of the induction coil (13) axially, at least in a subregion, extends radially between the outer circumference of the tool-side end of the sleeve section (5) and the inner circumference of the induction coil (13) and axially obliquely radially outward away from the end of the sleeve section (5).

2. The device as claimed in claim 1, wherein the ring element (27) is formed as a shielding collar which projects axially beyond the tool-side end of the sleeve section (5) overan axial height (h) of at least 1.5 times the diameter (d) of the shaft (11) of the tool and whose greatest diameter is smaller than the greatest winding diameter of the induction coil (13).

3. The device as claimed in claim 2, wherein the ring element (27) projects axially beyond the tool-side end of the sleeve section (5) over an axial height (h) of at least twice the shaft diameter (d).

4. The device as claimed in claim 3, wherein in the region radially between the sleeve section (5) and the induction coil (13), on its side facing axially toward the toolholder (1), the ring element (27) has an outer circumferential surface (31) which widens conically axially away from the toolholder (1).

5. The device as claimed in claim 4, wherein on its side facing axially away from the toolholder (1), the ring element (27) has an inner circumferential surface (33) which widens conically axially away from the toolholder (1).

6. The device as claimed in claim 5, wherein the outer (31) and inner (33) circumferential surfaces have approximately the same cone angle.

7. The device as claimed in claim 6, characterized in that, in the region of its outer circumference, the ring element (27) has a substantially cylindrical circumferential surface (39).

8. The device as claimed in claim 7, wherein in the region of its outer circumference, the ring element (27) has an annular extension (37) that projects axially away from the toolholder (1).

9. The device as claimed in claim 8, wherein the surface (31) of the ring element (27) which faces the interior of the induction coil (13) axially and runs obliquely runs inclined at an angle of between 10° and 80°, with respect to the axis (7) of the shaft (11) of the tool.

10. The device as claimed in claim 9, wherein the ring element (27) adjacent to the sleeve section (5) of the toolbolder (1) has a flat end surface (35) running axially normally to the axis of rotation (7) of the tool shaft (11), in order to rest flat on a flat end surface (25) of the sleeve section (5).

11. The device as claimed in claim 10, wherein the greatest diameter of the ring element (27) is smaller than the smallest winding diameter of the induction coil (13).

12. The device as claimed in claim 11, wherein in the region of its outer circumference and at one or both of its ends, the induction coil (13) has a jacket (23) of a magnetizable material that concentrates the magnetic flux.

13. The device as claimed in claim 12, wherein the ring element (27) runs on all sides at a distance from the jacket (23).

14. The device as claimed in claim 13, wherein the ring element (27) is held on a structural unit which encloses the induction coil (13), by means of a disk (41) of non-magnetizable material.

15. The device as claimed in claim 14, wherein the ring element (27) is fitted firmly to the disk (41), and the disk (41) is held replaceably on the structural unit during operation.

16. A device for the inductive heating of a sleeve section of a toolholder which contains a central holding opening for a shaft of a rotary tool, said toolholder holding the shaft of the tool seated in the holding opening with a press fit and releasing it when heated, the device comprising:

a) an induction coil, which encloses the sleeve section of the toolbolder annularly with a radial spacing for the heating;

b) a generator that feeds the induction coil with electric current of periodically changing amplitude; and c) a ring element, enclosing the shaft of the tool close to the tool-side end of the sleeve section of the toolholder and made of a magnetizable material that concentrates the magnetic flux, the ring element, in the region of its smallest diameter, being closely adjacent to the tool-side end of the sleeve section, wherein the ring element is formed as a shielding collar which projects axially beyond the tool-side end of the sleeve section over an axial height (h) of at least 1.5 times the diameter (d) of the shaft of the tool and whose greatest diameter is smaller than the greatest winding diameter of the induction coil.

17. The device as claimed in claim 1, wherein the ring element (27) in the region of its smallest diameter bears on the sleeve section (5).

18. The device as claimed in claim 9, wherein the surface (31) of the ring element (27) which faces the interior of the induction coil (13) axially and runs obliquely runs inclined at an angle of between 20° and 70°, with respect to the axis (7) of the shaft (11) of the tool.

19. The device as claimed in claim 14, wherein the ring element (27) is held on a structural unit which encloses the induction coil (13), by means of a disk (41) of plastic or ceramic.

20. The device as claimed in claim 11, wherein in the region of its outer circumference or at one or both of its ends, the induction coil (13) has a jacket (23) of a magnetizable material that concentrates the magnetic flux.

21. The device as claimed in claim 16, wherein the ring element in the region of its smallest diameter bears on the sleeve section.

* * * * *